(12) United States Patent
Takafuji et al.

(10) Patent No.: US 6,957,591 B2
(45) Date of Patent: Oct. 25, 2005

(54) PASSENGER JUDGING APPARATUS WITH LOAD SENSOR

(75) Inventors: Tetsuya Takafuji, Anjo (JP); Tomoji Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 53 days.

(21) Appl. No.: 10/366,373

(22) Filed: Feb. 14, 2003

(65) Prior Publication Data

US 2003/0154805 A1 Aug. 21, 2003

(30) Foreign Application Priority Data

Feb. 20, 2002 (JP) .............................. 2002-043534

(51) Int. Cl.$^7$ .............................................. G01L 1/26
(52) U.S. Cl. ................................................ 73/862.391
(58) Field of Search ................... 73/862.391, 862.381, 73/862.451, 862.045, 795

(56) References Cited

U.S. PATENT DOCUMENTS

| 5,624,132 | A | * | 4/1997 | Blackburn et al. | .......... 280/735 |
| 5,865,463 | A | * | 2/1999 | Gagnon et al. | ............. 280/735 |
| 6,015,163 | A | * | 1/2000 | Langford et al. | ........... 280/735 |
| 6,070,115 | A | * | 5/2000 | Oestreicher et al. | .......... 701/45 |
| 6,360,618 | B2 | * | 3/2002 | Anahid et al. | ......... 73/862.627 |
| 6,494,482 | B2 | * | 12/2002 | Curtis | ......................... 280/735 |
| 6,520,023 | B2 | * | 2/2003 | Kimura | ........................ 73/795 |
| 6,557,424 | B1 | * | 5/2003 | Morell | ................... 73/862.045 |
| 6,640,175 | B2 | * | 10/2003 | Vos et al. | ...................... 701/45 |
| 6,670,560 | B2 | * | 12/2003 | Curtis | ......................... 177/144 |
| 2002/0007240 | A1 | * | 1/2002 | Winkler | ....................... 701/49 |

FOREIGN PATENT DOCUMENTS

| EP | WO 99/38731 | 8/1999 |
| JP | 10-194079 | 7/1998 |
| JP | 2001-74541 | 3/2001 |

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

In a passenger judging apparatus with a load sensor excellent in practical use and capable of achieving not only the reduction of judgment delay in the case of the necessity for a quick judgment but also the improvement of the judgment accuracy in the other cases, a judgment indicating the occurrence of a state transition forming a transition between classes is made only when a load detected stays continuously in a predetermined class for a predetermined threshold time period, with the threshold time period being variably set to be different in length among inter-class state transitions. This contributes greatly to the improvement of the judgment accuracy by eliminating erroneous judgment stemming from a false signal without uselessly delaying the judgment on the state transition requiring a quick decision.

8 Claims, 12 Drawing Sheets

PASSENGER JUDGING APPARATUS WITH LOAD SENSOR

BACKGROUND OF THE INVENTION

1) Field of the Invention

The present invention relates to a passenger judging apparatus with a load sensor for a judgment on passengers (persons in a vehicle or the like, including a driver), located in a seat or the like. The invention is suitable for use in a safety device from collisions, such as an air bag.

2) Description of the Related Art

For example, for expansion control of an air bag, since it is a desirable manner to seize previously the body dimensions, physiques or the like of objects to be protected prior to the control of an expansion mode, a load sensor has so far been built in a seat of a vehicle (or in the vehicle) to make a judgment on the presence or absence of a passenger(s) or the body dimensions thereof on the basis of an output of the built-in load sensor. Basically, on the basis of an output voltage of the load sensor with respect to a predetermined threshold, a judgment is made as to non-seated, adult-seated and child-seated conditions.

However, the output of the load sensor varies with the getting-in/out of a passenger, posture variation thereof, variation of gravity acceleration (G) applied to the passenger during running (which will be referred to hereinafter as "running G"), and others, and in the case of a fixed threshold type, an erroneous judgment output occurs temporarily due to the variation of the output of the load sensor stemming therefrom.

For this reason, for the passenger judgment, it needs that a careful judgment operation is conducted to eliminate the temporary erroneous judgment output stemming from the posture variation of a passenger, the running G applied to the passenger, or the like for achieving the improvement of the judgment accuracy. Usually, the elimination of such a temporary erroneous judgment output has been made through the use of low-pass filter processing (low-frequency component extraction or averaging processing).

For example, EP99/00407 discloses a technique in which the judgment is made in a manner that an average value of the largest ten data of the past detection data is calculated to compare the resultant average value with a threshold. However, this technique has an advantage of improving the judgment accuracy and, at the same time, has a disadvantage that a delayed judgment result alteration occurs in a situation, such as replacement or getting-in/out of passengers, which requires an alteration of the judgment result.

In addition, Japanese Patent Laid-Open No. (HEI) 10-194079 discloses as technique in which a behavior of a vehicle is detected through the use of a G sensor and, when a decision is made that a vehicle is not in a stable condition, no alteration of the judgment takes place in spite of a change of a passenger detection result. However, this system requires the additional employment of the G sensor and takes no effect with respect to a variation of output of a load sensor in a case in which a passenger spontaneously changes his/her posture regardless of running conditions.

That is, although conventional passenger judgment techniques using an output of a load sensor is effective in providing a judgment result with high accuracy, they require the prolonged time taken for the judgment and, hence, cannot cope with a case in which the necessity for the passenger judgment information arises rapidly, for example, immediately after the getting-in/out of a passenger.

SUMMARY OF THE INVENTION

The prevent invention has been developed in order to eliminating the above-mentioned problems, and it is therefore an object of the invention to provide a passenger judging apparatus using a load sensor excellent in practical use, which is capable of achieving not only the reduction of judgment delay in the case of the necessity for a quick judgment but also the improvement of the judgment accuracy in the other cases.

For this purpose, in accordance with the present invention, there is provided a passenger judging apparatus comprising a load sensor for detecting a load acting on a seat of a vehicle and judging means for classifying the load, converted into a signal, as one of many classes according to a predetermined load threshold to make a judgment on the presence or absence of a passenger or a type thereof, wherein the judging means makes a judgment indicating the occurrence of a state transition forming a transition between the classes when the detected load stays continuously in the class for a predetermined threshold time period, with the threshold time period being set to be different in length in determining at least a plurality of state transitions.

That is, for seizing the state transition between the divided classes (change of class) depending on the magnitude of the load detected, a threshold time period that is to pertain to a class different from the present class is set to have different lengths in a plurality of classes. Thus, a delay time based on suitable judgment and a duration of a temporary false signal (alias) introduced into the judgment assume a different value for each state transition, which contributes greatly to the improvement of the judgment accuracy by eliminating erroneous judgment stemming from a false signal without uselessly delaying the judgment on the state transition requiring a quick decision.

In addition, in the passenger judging apparatus using the load sensor, the judging means has an "unoccupied", an "adult" and a "child" as the classes, and the threshold time period for the state transition between the "unoccupied" and the "adult" or the "child" is set to be shorter than the threshold time period for the state transition from the "adult" to the "child".

That is, in this case, the judgment on the getting-in/out transition (when a passenger gets in/out) is made at a higher speed in comparison with the "adult"-to-"child" state transition of transitions while seated (a case in which the result of judgment on a passenger being in a seated condition varies between an "adult" and a "child" for some reason).

Accordingly, since the time needed for the final judgment can be shortened at the getting-in/out, the final judgment result can quickly be given for the necessary control (ordinarily, the above-mentioned safety control from collision) of a vehicle so that the necessary vehicle control quickly starts appropriately, and for the judgment on the state transmission from, the "adult" to the "child", the influence from a load lowering phenomenon is eliminable to classify the state transition from the "adult" to the "child" with high accuracy.

Naturally, since the time for the judgment on the state transition from the "adult" to the "child" is set to be relatively long, during the judgment, there exists a possibility of the occurrence of a situation that the vehicle control is implement through the use of passenger type information. However, in this case, since there is no alteration of the judgment that, at least, either the "adult" or the "child" is in a seated condition, the vehicle control still needed can be implemented on the basis of this judgment result. Moreover, such erroneous state transmission judgments originating from the temporary load lowering phenomenon reduce as the judgment starts and repeats and, hence, the initial level in the last state transition judgment converges more advantageously into a true value.

In this connection, the state transition from the "adult" to the "child", that is, a change of judgment, arises due to a temporary (short-time) load variation stemming from variation of posture of a passenger, variation of acceleration (running G) operative to the passenger by running, or the like, as mentioned above. As one example of the variation of the posture of the passenger, there is a child's play while seated. A long-time continuation of the state transition from the "adult" to the "child" is extremely uncommon, and it is eliminable in a manner that the time needed for the judgment is set to be sufficiently long, thus realizing a high-accuracy judgment.

Still additionally, in the passenger judging apparatus using the load sensor, the judging means has an "unoccupied", an "adult" and a "child" as the classes, and the threshold time period for the state transition between the "unoccupied" and the "adult" or the "child" is set to be shorter than the threshold time period for the state transition from the "child" to the "adult".

That is, in this case, the judgment on the getting-in/out transition (when a passenger gets in/out) is made at a higher speed in comparison with the child-to-adult state transition of the transitions while seated (a case in which the result of judgment on a passenger being in a seated condition varies between an "adult" and a "child" for some reason).

Accordingly, since the time needed for the final judgment can be shortened at the getting-in/out, the final judgment result can quickly be given for the necessary control (ordinarily, the above-mentioned safety control from collision) of a vehicle so that the necessary vehicle control quickly starts appropriately, and for the judgment on the state transmission from the "child" to the "adult", the influence from a load lowering phenomenon is eliminable to classify the state transition from the "child" to the "adult" with high accuracy.

Naturally, since the time for the judgment on the state transition from the "child" to the "adult" is set to be relatively long, during the judgment, there exists a possibility of the occurrence of a situation that the vehicle control is implement through the use of passenger type information. However, in this case, since there is no alteration of the judgment that, at least, either an adult or child is in a seated condition, the vehicle control still needed can be implemented on the basis of this judgment result. Moreover, such erroneous state transmission judgments originating from the temporary load lowering phenomenon reduce as the judgment starts and repeats and, hence, the initial level in the last state transition judgment converges more advantageously into a true value.

In this connection, the state transition from the "child" to the "adult", that is, a change of judgment, arises due to a temporary (short-time) load variation stemming from variation of posture of a passenger, variation of acceleration (running G) operative to the passenger by running, or the like, as mentioned above. As one example of the variation of the posture of the passenger, there is a child's play while seated. A long-time continuation of the state transition from the "child" to the "adult" is extremely uncommon, and it is eliminable in a manner that the time needed for the judgment is set to be sufficiently long, thus realizing a high-accuracy judgment.

Yet additionally, in the passenger judging apparatus using the load sensor, the judging means has an "unoccupied", an "adult" and a "child" as the classes, and the threshold time period for the state transition from the "child" to the "adult" is set to be shorter than the threshold time period for the state transition from the "adult" to the "child".

This arrangement can shorten the time taken for the judgment on the state transition from the "child" to the "adult". Providing a further explanation, the state transition from the "child" to the "adult", i.e., a change of judgment, almost always arises when a load does not work normally on the load sensor due to an irregular posture of an adult rather than a change of posture of a child. On the other hand, in the case of the state transition from the "adult" to the "child", the judgment that it is the "adult" can be made resulting from a change of posture for a play of the child changeable in posture and, hence, the erroneous judgment condition to the "adult" can continue for a long time.

For this reason, in this mode, the threshold time period for the state transition from the "child" to the "adult" is set to be relatively short, thereby shortening the judgment time period for the state transition from the "child" to the "adult" while suppressing the lowering of the judgment accuracy.

Moreover, in the passenger judging apparatus using the load sensor, the judging means has an "unoccupied", an "adult" and a "child" as the classes, and the threshold time period for the state transition from the "child" or the "adult" to the "unoccupied" is set to be shorter than the threshold time period for the state transition from the "unoccupied" to the "adult" or the "child".

Explaining concretely, the state transition from the "child" or the "adult" to the "unoccupied" immediately enters a stable condition because the load falls into a considerably reduced condition. On the other hand, in the contrary case, for example, the state transition takes place in a state where a person is seated while being supported by his/her hand, while holding on to something, or while his/her waist is delicately lifted and shifted to adjust to a normally seated position, so it relatively takes time before the load becomes stable.

Accordingly, in this mode, the threshold time period for the state transition from the "adult" or the "child" to the "unoccupied" is set to be shorter than the threshold time period for the contrary state transition, thus shortening the judgment time for the state transition from the "child" or the "adult" to the "unoccupied" while suppressing the lowering of the judgment accuracy.

Still moreover, in the passenger judging apparatus using the load sensor, the judging means makes a judgment on the state transition between the "unoccupied" constituting the class and another class on the basis of the load including a relatively large quantity of high-frequency signal component in comparison with the judgment on the state transition between the classes other than the "unoccupied".

That is, in this mode, a "load" forming a signal including a relatively large quantity of high-frequency signal component is used for the judgment on the state transition between the "unoccupied" and the other class, which shortens the time needed for the judgment owing to the improved response, and for the judgment on the state transition between the "adult" and the "child", particularly from the "adult" to the child", a "load" forming a signal in which a high-frequency signal component is relatively reduced is used, thus reducing the variation of the load waveform stemming from the adult's or child's temporary posture variation, which leads to the improvement of the judgment accuracy. In particular, this arrangement is effective in that, in a case in which the load serving as a signal fluctuates, the fluctuation component is sufficiently removable. Incidentally, although the "unoccupied" judgment has influence of the fluctuation (ringing) of the load, when an adult or child gets out so that the seat becomes an unoccupied condition, the influence of the fluctuation (ringing) is very slight because the absolute value of the load is small. Therefore, even if the load including a high-frequency signal component is used for the judgment, the judgment accuracy scarcely lowers, thus realizing a quick judgment. The high-frequency signal component reduced load, i.e., the low-frequency component of the load, is easily obtainable through the use of low-pass filter processing, and is also attainable by means of averaging processing similar thereto.

Yet moreover, in the passenger judging apparatus using the load sensor, the judging means has an "unoccupied", an "adult" and a "child" as the classes, and at the state transition from the "unoccupied" to the "adult" or the "child", the threshold time for the judgment on the state transition between the "adult" and the "child" is prolonged in a state correlated with the elapsed time from when a judgment is made that the "unoccupied" is canceled.

Explaining concretely, when a passenger sits forcibly on an unoccupied seat, the load detected can overshoot, which produces a possibility that an erroneous judgment is made such that a child-seated condition is taken for an adult-seated condition. Accordingly, if the threshold time period to be used for the state transition from the "adult" to the "child" is set to be long, there arises a disadvantage of difficulty being experienced in briefly correcting the judgment result, i.e., the "adult" judged in error immediately after the sitting.

For this reason, for the judgment on the state transition between the "adult" and the "child", particularly for the judgment on the state transition from the "adult" to the "child", the threshold time period is set to be short for a predetermined time period after the time of the cancellation of the "unoccupied" to enable quick correction to the "adult", while the threshold time period is thereafter prolonged to achieve high-accuracy judgment. This can reduce the influence of the above-mentioned overshoot. Incidentally, the prolongation of the length of the threshold time period can also be made by stages (stepwise) or continuously on the time base.

Furthermore, in the passenger judging apparatus using the load sensor, the load sensor detects a distribution of a surface pressure on a sitting face of a seat, and the judging means compares the load forming the sum of the surface pressures detected by the load sensor with a predetermined first load threshold to make a judgment as to whether or not the class is the "unoccupied", and calculates a value of a function having a correlation with a body dimension of a passenger on the basis of a two-dimensional distribution of the surface pressures to compare the function value with a predetermined second load threshold for making a judgment between the "adult" and the "child".

That is, in this arrangement, the judgment on the state transition between the "unoccupied" and the other class is made by classifying a plurality of the sums of surface pressures on the seat face, and the judgment between the "adult" and the "child" is made by classifying function values of a predetermined function representative of a surface pressure distribution and having a correlation with a body dimension of a passenger or by classifying the low-frequency components thereof. This enables a quick judgment as to whether or not it is the "unoccupied" and allows the classification (division) between the "adult" and the "child" with high accuracy. Incidentally, the detailed description of the above-mentioned "predetermined function representative of a surface pressure distribution and having a correlation with a body dimension of a passenger" has been given in Japanese Patent Laid-Open No. 2001-201412, applied by the present applicant.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Referring to the following embodiments, a description will be given hereinbelow of preferred modes of the present invention.

(First Embodiment)

Figure 1:
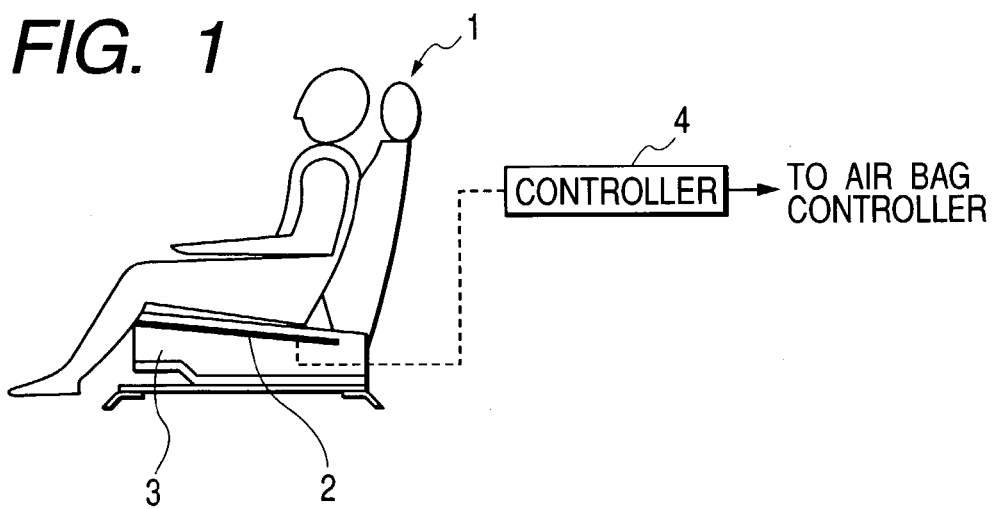
FIG. 1 is a side elevational view illustratively showing a passenger judging apparatus using a load sensor according to the present invention.
Figure 2:
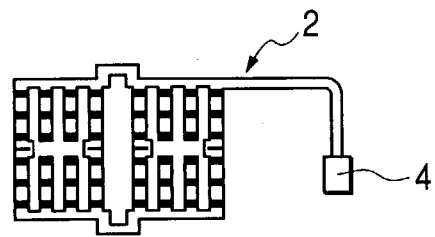
FIG. 2 is a plan view of the load sensor shown in FIG. 1.

With reference to FIG. 1 which is a vertical cross-sectional view showing a passenger seat (assistant driver's seat), a description will be given hereinbelow of an apparatus according to this embodiment. In FIG. 1, there are shown a seat 1, a sheet-like pressure-sensitive sensor 2 placed in an upper part of a sitting section 3 of the seat 1 and a controller 4 comprising a microcomputer with an A/D converter. FIG. 2 is a plan view showing the pressure-sensitive sensor 2.

Figure 3:
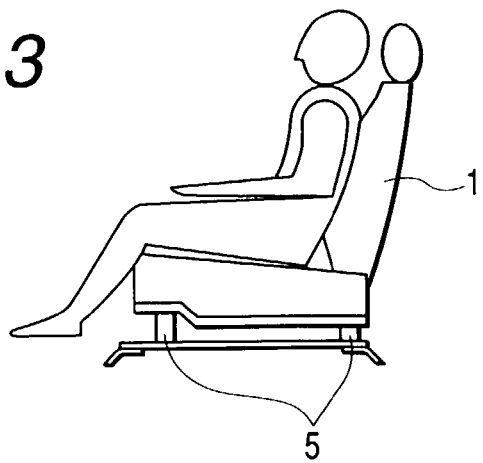
FIG. 3 is a side elevational view showing another example of the load sensor in the present invention.
Figure 4:
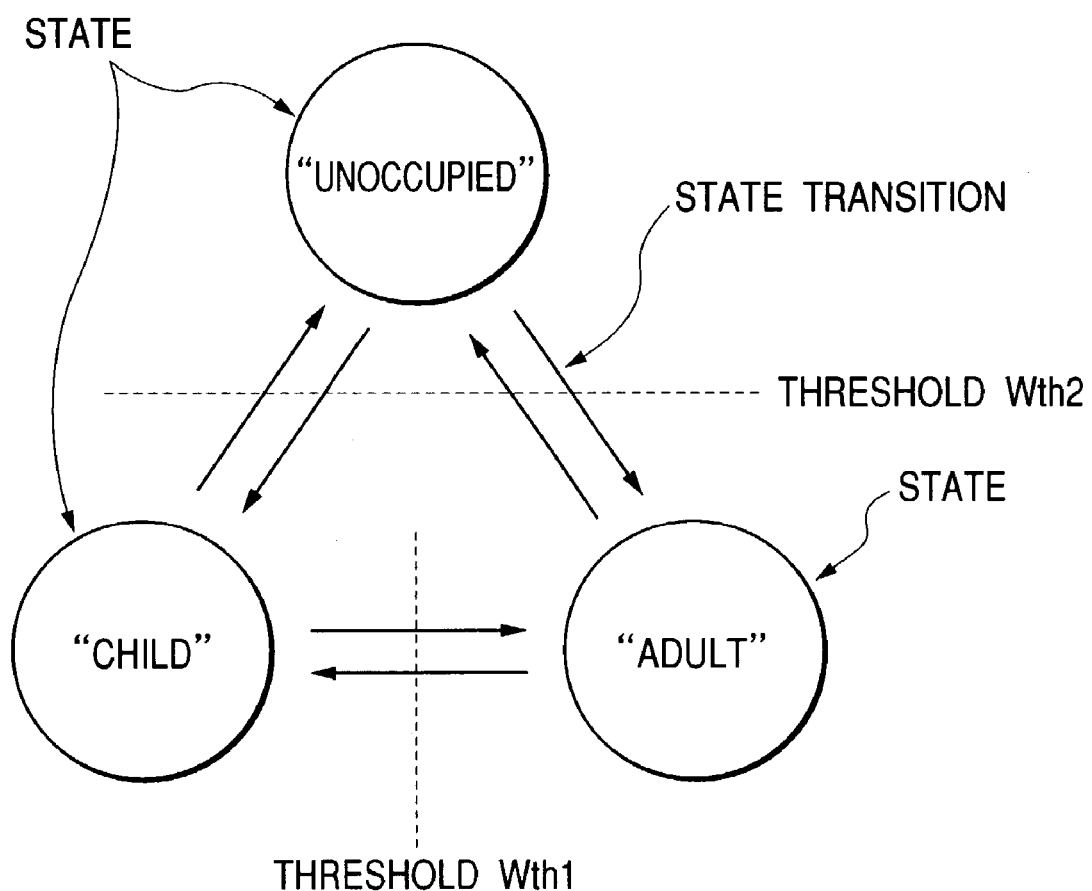
FIG. 4 is an illustration of a state transition among "unoccupied", "child" and "adult"

The pressure-sensitive sensor 2 is made up of a conductive-grain-laced rubber layer whose electric resistance drops in accordance with a compressive force working thereon and a pair of electrode sheets which are separately adhered closely to both main surfaces of the rubber layer, respectively. As indicated by black points in FIG. 2, the rubber layer spreads at a generally equal density in a substantially front surface of the sitting section 3. Thus, when a human body (or an object) sits on the seat 1, an electric resistance between both the electrode sheets lowers with an increase of its weight. It is also appropriate to, in place of the pressure-sensitive sensor 2, employ pressure sensors (load sensors) 5 put in legs fixedly secured onto a floor of an automobile to support the seat 1 as shown in FIG. 3.

The controller 4 applies a predetermined dc voltage through a load resistor to between both the electrode sheets of the pressure-sensitive sensor 2 or supplies a constant current thereto, whereby the controller 4 detects a weight of a passenger sitting on the seat 1 on the basis of the degree of a voltage drop of the pressure-sensitive sensor 2. The voltage drop of the pressure-sensitive sensor 2 is converted through the A/D converter of the controller 4 into a digital signal which, in turn, is read by the microcomputer of the controller 4.

Figure 5:
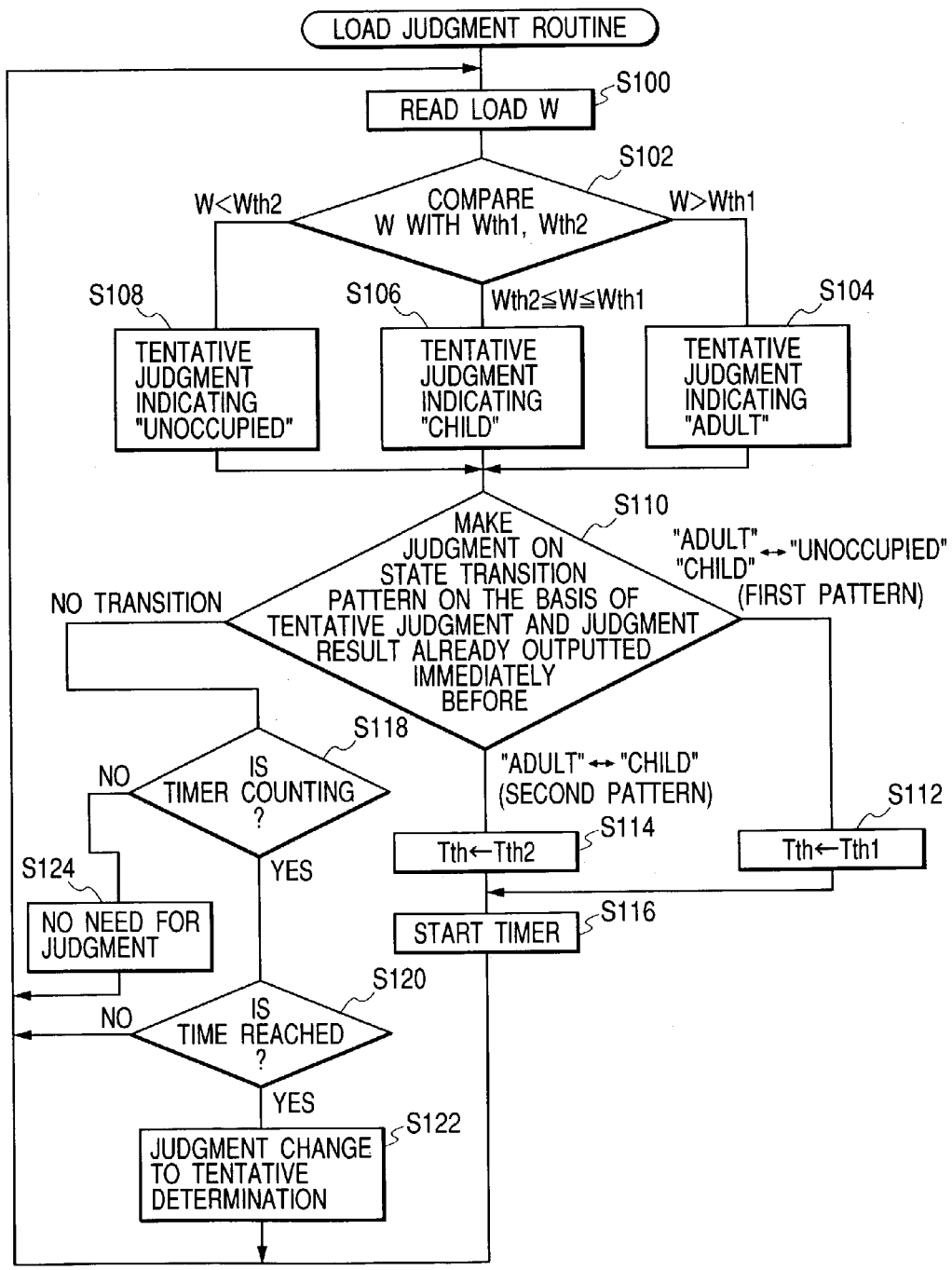
FIG. 5 is a flow chart showing a judgment operation according to a first embodiment of the present invention.

Referring to the flow chart of FIG. 5, a description will be given hereinbelow of judgment processing in this embodiment to be implemented in the controller 4.

First of all, the voltage drop read out from the pressure-sensitive sensor 2 is converted into a load W (S100) which in turn is compared with two different thresholds Wth1 and Wth2 (S102). If the load W is larger than Wth1, the person sitting on the seat 1 is tentatively determined (judged) as an "adult" (S104). If the load W exists between Wth1 and Wth2, the person is tentatively determined as a "child" (S106). On the other hand, if the load W is smaller than Wth2, the tentative determination is that nobody ("unoccupied") sits on the seat 1 (S108). The threshold Wth1 is set to be larger by a predetermined value than the threshold Wth2. In this connection, since the digital value corresponding to the load W has a predetermined correlation with the magnitude of the actual load, it is also appropriate that this digital value is directly compared with the load thresholds Wth1 and Wth2. Moreover, although in this embodiment the present value of the load W, i.e., an instantaneous value, is employed as the quantity to be compared, it is also appropriate that the removal of high-frequency noise components is made for an average value thereof obtained for a short time immediately before the comparison. Still moreover, although in this embodiment the judgment is made among three states: the "unoccupied" (unoccupied seat), the "child" (child-seated condition) and the "adult" (adult-seated condition), it is also possible to increase the number of thresholds for setting more states.

Secondly, the present state transition is judged on the basis of a state judged immediately before and currently retained and the present state tentatively determined (S110). In this embodiment, six state transitions in total are classified into three state transition patterns: a first state transition pattern including the state transition from the "unoccupied" to the "adult", the state transition from the "adult" to the "unoccupied", the state transition from the "unoccupied" to the "child" and the state transition from the "child" to the "unoccupied", a second state transition pattern including the state transition from the "adult" to the "child" and the state transition from the "child" to the "adult" and non-state-transition pattern. It is also acceptable to classify them into more state transition patterns.

Following this, when the judgment shows the first state transition pattern, a threshold time period Tth of a timer for setting a watching time period to be taken until the final judgment on the state transition is made is set to a first threshold time period Tth1 (S112). On the other hand, when being made to the second state transition pattern, the threshold time period Tth of the timer for setting the watching time period to be taken until the final judgment on the state transition is made is set to a second threshold time period Tth2 (S114). At this time, if the timer is presently in operation, the timer is reset and resumed. If the timer is not in operation, the timer starts at zero (S116). In this case, an important consideration is that the first threshold time period Tth1 is set to be shorter than the second threshold time period Tth2.

If the answer of the step S110 shows no state transition, a decision is made as to whether or not the timer is presently in a counting operation (S118). If it is in the counting operation, a check is made as to whether or not the timer reaches the end of the threshold time period Tth (=Tth1 or Tth2 set in the step S112 or S114) (S120). If the end of the threshold time period Tth is not reached, the operational flow returns to the step S100. If reached, the judgment is changed to the tentative determination in the step S104, S106 or S108 (S122), and this result is outputted to an air bag controller (not shown). Thereafter, the operational flow returns to the step S100. On the other hand, if the answer of the step S118 shows that the timer is not in the counting operation, a change of the present judgment is inhibited (S124), and the operational flow returns to the step S100. Likewise, if the decision at the step S120 indicates that the count value of the timer does not reach the threshold time period Tth, the operational flow returns to the step S100.

That is, in this embodiment, the air bag controller is not immediately responsive to a variation of output of the pressure-sensitive sensor 2 to change the judgment on the presence or absence or type of a sitting person, but it is designed to change the judgment on the presence or absence or type of a sitting person only when the output variation of the pressure-sensitive sensor 2 lasts for a predetermined waiting time period. Therefore, it is possible to prevent making frequent erroneous judgment stemming from temporary disturbance of the output of the pressure-sensitive sensor 2 for the above-mentioned various reasons, and to eliminate disadvantages of the judgment being frequently changed. Moreover, for the change of the judgment on the state transition between the "adult" and the "child", the above-mentioned predetermined waiting time period is prolonged with respect to the change of the judgment at the state transition between the "adult" or the "child" and the "unoccupied", and this achieves a high-accuracy change of judgment at the state transition between the "adult" and the "child" which takes long time for precision. Still moreover, it is possible to quickly perform the judgment change at the state transition between the "adult" or the "child" and the "unoccupied" which requires a relatively quick operation and to quickly transmit correct information to the air bag controller, so the air bag controller can accurately handle the air bag control immediately after the getting-in/out. Incidentally, as mentioned above, in the case of the judgment change at the state transition between the "adult" and the "child", the state transition judgment takes relatively long time, and during this judgment time, on the basis of previous judgment results, the air bag controller has at least information about the fact that either an adult or child is in a seated condition. Accordingly, there is almost no adverse influence on the air bag control. That is, with the repetition of the judgment, due to the judgment history up to that time, almost all the state transitions between the "adult" and the "child" which takes a seated condition are occupied by noises and, hence, almost all the judgment results indicating the "adult" or the "child", stored in the air bag controller, converge into a true value. Therefore, the air bag controller can implement appropriate air bag control on the basis of the information stored therein.

(First Modification)

Although in the above-described embodiment the final judgment of the state transition is made in a case in which, after the judgment on a state transition is made in the step S110 and the timer starts in the step S116, no change of the state after the transition continuously takes place for the threshold time period set in the step S112 or S114, it is also appropriate that the final judgment of the state transition is made when, during that threshold time period, the time length of a non-changed state after the transition exceeds a given time rate with respect to that threshold time period.

(Second Modification)

In the case of the state transition from the "child" to the "adult", when a child is in a seated condition, an increase in the sensor output, exceeding his/her weight, is hard to consider, whereas it is considered that a correct judgment is not made because an adult takes a sitting posture different from the initial posture so that his/her load acts insufficiently and the adult then re-sits thereon. Accordingly, the timer threshold for the state transition from the "child" to the "adult" is set to be as short as approximately five seconds. On the other hand, since it is considered that the state transition from the "adult" to the "child" occurs because the sensor output is lowered due to an adult's posture variation or the running G of the vehicle as mentioned above, it is also possible to design a passenger detection system in which the timer threshold is set to be long so that the alteration to the correct judgment is immediately feasible while the alteration to an incorrect judgment is hard to make. That is, if the second threshold time period Tth2 at the state transition from the "child" to the "adult" is set to be shorter than the second threshold time period Tth2 at the state transition from the "adult" to the "child", more appropriate judgment becomes feasible.

(Third Modification)

Although the judgment on the state transition from the "child/adult" to the "unoccupied" can readily be made because the load only disappears, in the case of the state transition from the "unoccupied" to the "child/adult", it is considered that a passenger is seated while being supported by his/her hand or moves to a settled position. When seated, there is a possibility that the sensor output becomes unstable. Accordingly, the timer threshold (first threshold time period Tth1) for the state transition from the "child/adult" to the "unoccupied" is set to be short while the timer threshold (first threshold time period Tth1) for the state transition from the "unoccupied" to the "child/adult" is set to be long, thus enhancing the detection sensitivity of an unoccupied condition and reducing the erroneous judgment stemming from dynamic disturbance because, for the judgment on a seated condition, the type of the passenger is identified after a stable condition. That is, the first threshold time period Tth1 at the state transition from the "child/adult" to the "unoccupied" is set to be shorter than the first threshold time period Tth1 at the state transition from the "unoccupied" to the "adult or child". This is more suitable.

(Second Embodiment)

Figure 6:
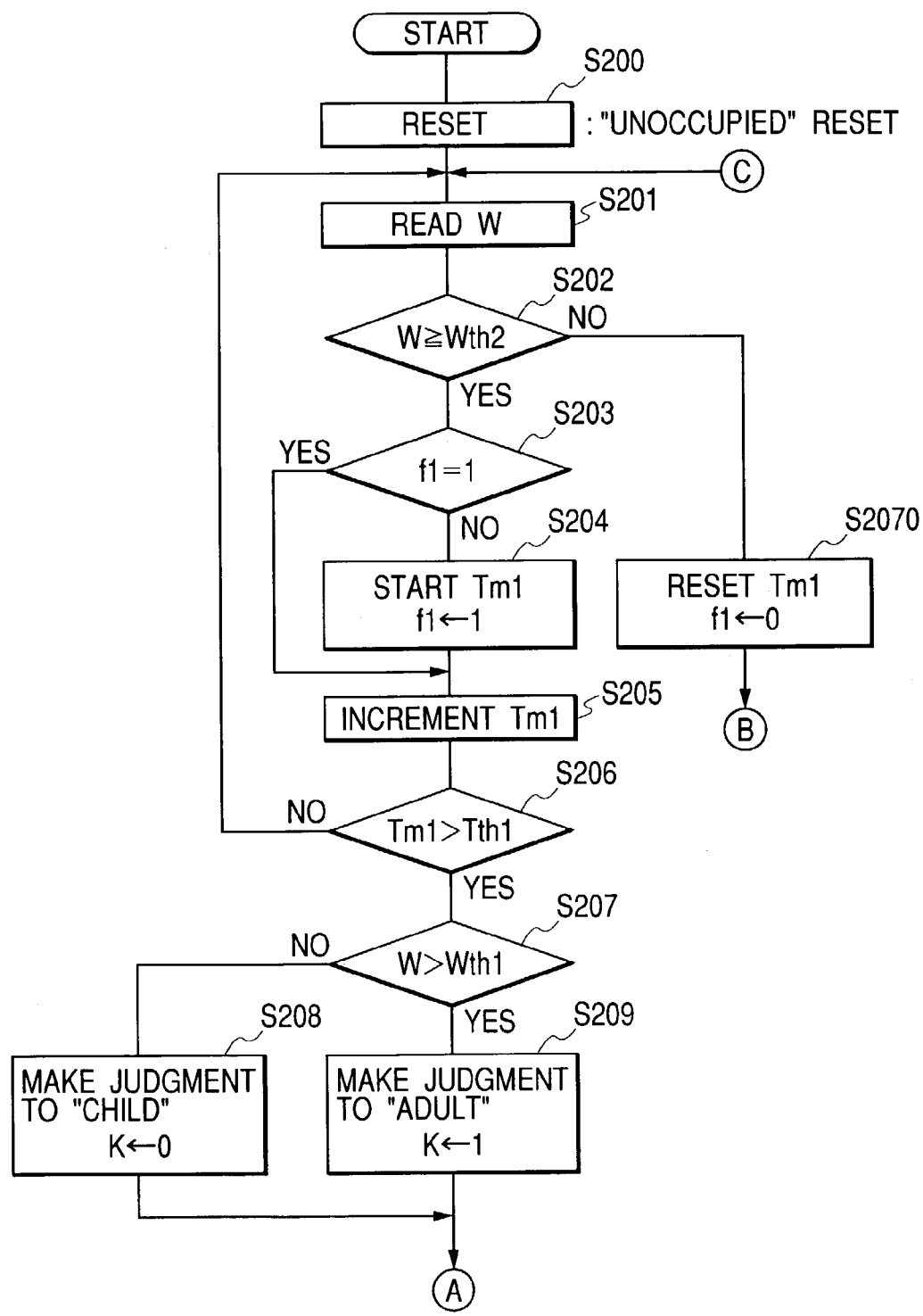
FIG. 6 is a flow chart showing a judgment operation according to a second embodiment of the present invention.
Figure 7:
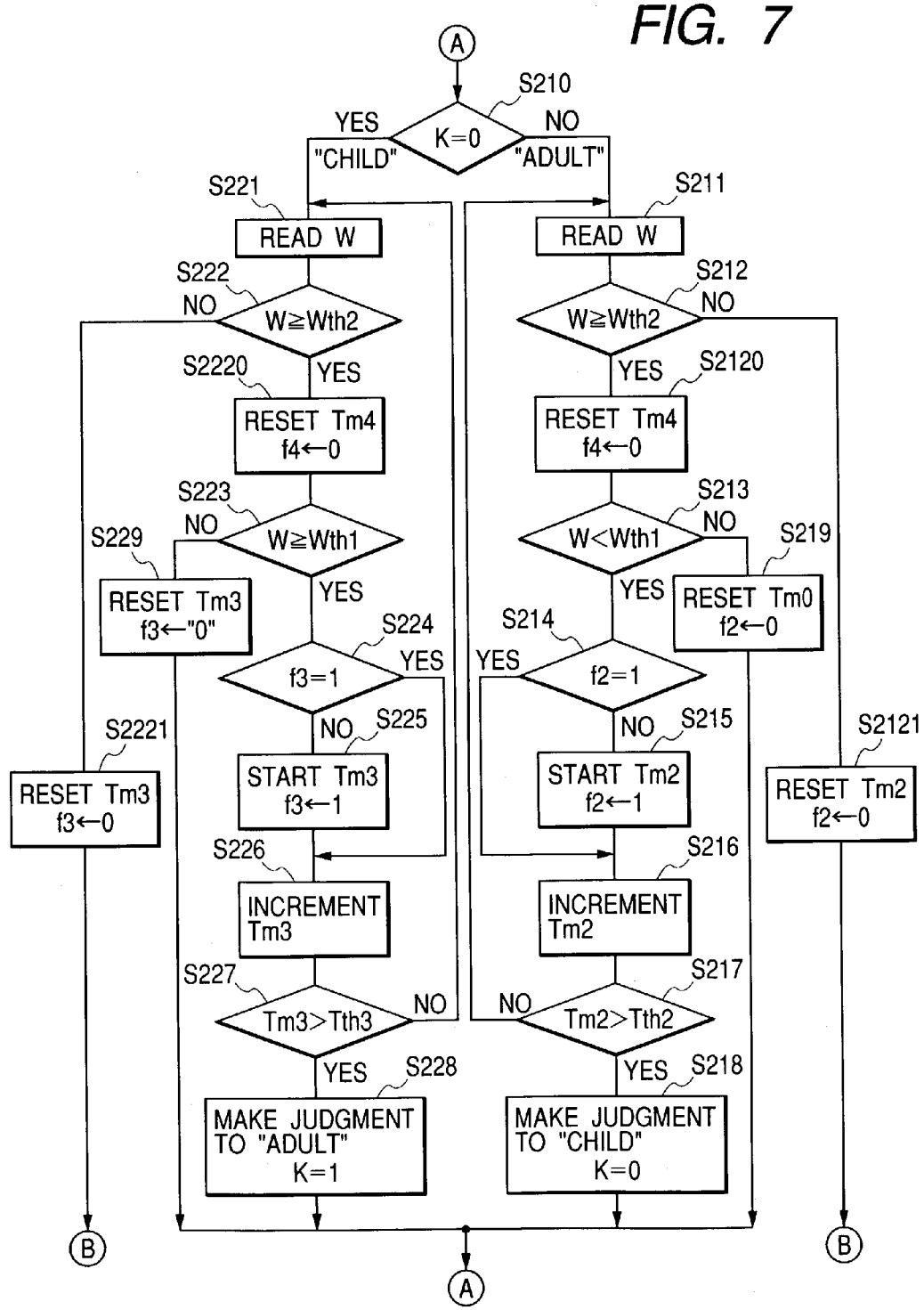
FIG. 7 is a flow chart showing a judgment operation according to the second embodiment of the present invention.
Figure 8:
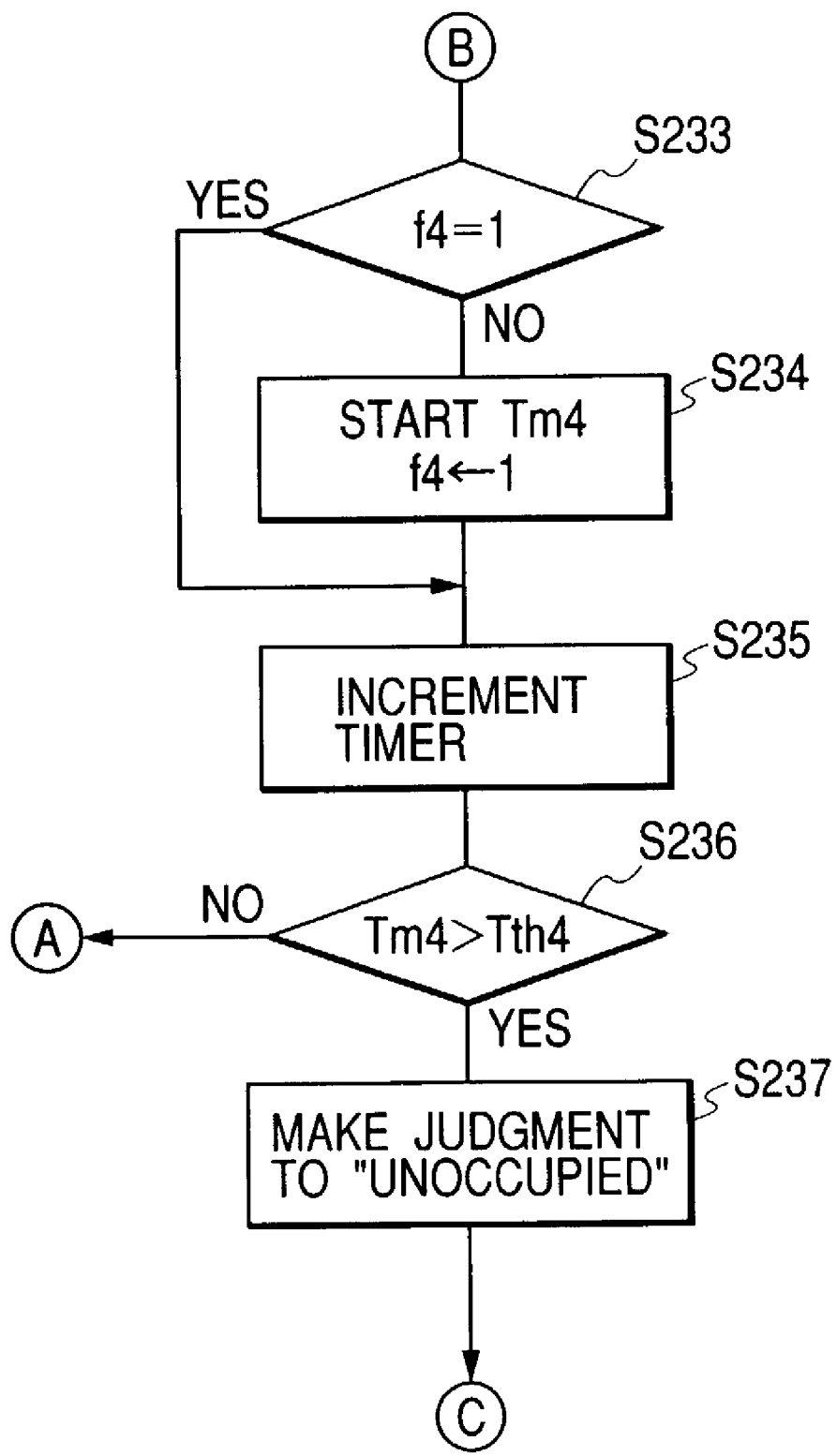
FIG. 8 is a flow chart showing a judgment operation according to the second embodiment of the present invention.

Another embodiment will be described hereinbelow with reference to flow charts of FIGS. 6 to 8.

In this embodiment, in comparison with the above-described first embodiment, two timers are additionally employed, that is, four timers in total are put to use. The first timer Tm1 is made to start in response to the detection of the state transition from the "unoccupied" to the "adult" or the "child", and the threshold time period of this timer Tm1 is set to Th1. The second timer Tm2 is made to start in response to the detection of the state transition from the "adult" to the "child", with the threshold time period of this timer Tm2 being set to Th2. The third timer Tm3 is designed to start on the basis of the detection of the state transition from the "child" to the "adult", with the threshold time period of this timer Tm3 being set at Th3. The fourth timer Tm4 is designed to start on the basis of the detection of the state transition from the "child" or the "adult" to the "unoccupied", with the threshold time period of this timer Tm4 being set at Th4.

The initialization (resetting) is made in response to the power-on (S200). At this time, the seated condition is set to "unoccupied". Then, a lead W is read out from the pressure-sensitive sensor 2 (S201), and the load w read is compared with a smaller load threshold Wth2 (S202). If the load W is equal to or more than Wth2, a check is made as to whether or not a flag f1 is "1" (S203). If it is "0", the first timer Tm1 is operated to start and the flag f1 is set at "1" (S204). On the other hand, if it is "1", the operational flow jumps to a step S205.

At the step S205, the first timer Tm1 undergoes an increment. Then, a check is made as to whether or not the count value of the timer Tm1 is greater than the first threshold time period Th1 (whether or not the timer Tm1 reach the termination (expiration)) (S206). If it does not reach the termination, the operational flow returns to the step S201. On the other hand, if the decision at the step S202 indicates that the load W is smaller than Wth2, the first timer Tm1 is reset to set the flag f1 to "0" (S2070), and the operational flow advances to a step S230.

If the decision at the step S206 shows that the count value of the timer Tm1 is larger than the first threshold time period Tth1 (the timer Tm1 reaches the termination), the load W is compared with a larger load threshold Wth1 (S207). If the load W exceeds Wth1, the judgment is made to indicate the "adult" and a flag K is set at "1" (S208). Otherwise, the judgment is made to indicate the "child", and the flag K is set at "0" (S209). Then, the operational flow goes to a step S210.

The step S210 is for making a decision on the flag K. If the flag K is "1" ("adult"), the load W is read (S211), and the read load W is compared with the smaller load threshold Wth2 (S212). If the load W is equal to or more than Wth2, the timer Tm4 is reset and a flag f4 is reset to "0" (S2120), then followed by a step S213. On the other hand, if the answer of the step S212 shows that the load W is below Wth2, the timer Tm2 is reset and the flag f2 is reset to "0" (S2121), then followed by a step S233.

The step S213 is implemented to compare the load W with Wth1, and if the answer of the step S213 shows that the load W is smaller than Wth1, a check is made as to whether or not the flag f2 is "1" (S214). If the flag F2 is "0", the second timer Tm2 is operated to start and the flag f2 is set at "1" (S215). If it is "1", the operational flow jumps to a step S216.

At the step S216, an increment of the second timer Tm2 takes place. Following this, the count value of the timer Tm2 is compared with the second threshold time period Tth2 (to check whether or not the timer Tm2 reaches the termination) (S217). If it does not reach the termination (Tm2>Tth2), the operational flow returns to the step S210.

On the other hand, if in the step S213 the load W is equal to or more than Wth1, the timer Tm2 is reset and the flag f2 is reset to "0" (S219). Then, the operational flow returns to the step S210.

If the decision at the step S210 shows that the flag K is "0" ("child"), the load W is read (S221), and the load W read is compared with the smaller load threshold Wth2 (S222). If the load W is equal to or more than Wth2, the timer Tm4 is reset and the flag f4 is reset to "0" (S2220), then followed by a step S223. On the other hand, if the load W is smaller than Wth2, the timer Tm3 is reset and the flag f3 is reset to "0" (S2221), then followed by a step S233.

When in the step S223 the load W is equal to or more than Wth1, a check is made as to whether or not the flag f3 is "1" (S224). If f3="0", the third timer Tm3 is driven to start and the flag f3 is set to "1" (S225). If f3="1", the operational flow jumps to a step S226.

At the step S226, an increment of the third timer Tm3 takes place. Then, the count value of the timer Tm3 is compared with a third threshold time period Tth3 (to check whether or not the timer Tm3 reaches the termination) (S227). If it does not reach the termination, the operational flow returns to the step S221. If it reaches the termination, the judgment is made as being the "adult" (S228). Then, the operational flow returns to the step S210.

On the other hand, if the answer of the step S223 shows that the load W is smaller than Wth1, the timer Tm3 is reset and the flag f3 is reset to "0" (S229). Then, the operational flow returns to the step S210.

The step S233 is for check whether or not the flag f4 is "1". If f4="0", the operation starts the fourth timer Tm4 and sets the flag f4 to "1" (S234). If f4= "1" in the step S233, the operational flow jumps to a step S235.

At the step S235, an increment of the fourth timer Tm4 takes place. Following this, the count value of the timer Tm4 is compared with a fourth threshold time period Tth4 (to check whether the timer Tm4 reaches the termination) (S236). If it does not reach the termination, the operational flow returns to the step S210. If it reaches the termination, the judgment is made as being "unoccupied" (S237), and the operational flow returns to the step S201. Furthermore, if the judgment result at the step S236 shows "NO", the operational flow returns to the step S210.

Also in this embodiment, since at least the threshold time periods Tth1 and Tth4 are set to be shorter than the threshold time periods Tth2 and Tth3, the effects similar to those of the above-described first embodiment are obtainable. In addition, the threshold time periods Tth1 and Tth4 can be set to be different values as required and the threshold time periods Tth2 and Tth3 can be set at different values as required, thus realizing more appropriate control.

For example, if the threshold time period Tth4 is set to be shorter than five seconds, preferably when it is set at as a small value as approximately two seconds, the judgment on the "unoccupied" can briefly be made after the getting-out. On the other hand, with respect to the reduction of the output of the pressure-sensitive sensor 2 stemming from an adult's posture variation or a vehicle running state variation, for example, if the threshold time period Tth2 is set to be shorter than 30 seconds, preferably, when it is set at as a large value as approximately 60 seconds, the variation of the judgment output is preventable, thereby reducing the erroneous judgment.

(Fourth Modification)

In the above-described embodiment, in a case in which the output of the pressure-sensitive sensor 2 fluctuates, when a person whose load W (weight) is in the vicinity of the threshold Wth1 sits, the judgment becomes incorrect when being made at high or low portions of the fluctuating waveform. For this reason, it is also appropriate that a low-frequency component (or average value) of the output of the pressure-sensitive sensor 2 is extracted to use this low-frequency component for the judgment in the step S213 or S223. In this connection, in the case of the "unoccupied", even if a fluctuation occurs, the output of the pressure-sensitive sensor 2 scarcely exceeds the threshold Wth2 (the load W assumes a value close approximately to zero), and the aforesaid fluctuation hardly has influence thereon. Accordingly, such low-pass filter processing is not conducted, thereby enabling a high-speed judgment. This allows the detection of the getting-in/out to be quickly made and enables further improvement of the accuracy of the classification between the "adult" and the "child".

(Fifth Modification)

When a passenger sits forcibly on a seat, the load overshoots, which can temporarily produce a large load value. Depending on the setting of the timer threshold and the sitting manner, there is a possibility that the judgment is made just when the overshoot occurs so that the result of the judgment shows the "adult" when a child sits on the seat. In the case of the above-described embodiment, once the judgment is made as being the "adult", the judgment change to the "child" is not made for a considerably long time, and an undesirable situation occurs uncommonly.

Accordingly, the timer threshold for the judgment between the "child" and the "adult" is changed to be longer as the state continuation time period (T1) becomes longer after seated, and the initial threshold time periods Tth2 and Tth3 when a passenger sits on the seat are set to be short and they are gradually prolonged according to the passage of time after the sitting. This also usefully improves the judgment accuracy while reducing the erroneous judgment stemming from the above-mentioned overshoot of the detection load. Incidentally, the variation of the threshold time periods Tth2 and Tth3 with the passage of time can be made stepwise, continuously or in a zigzag fashion.

(Sixth Modification)

In a case in which the pressure-sensitive sensor 2 is composed of a plurality of load sensors located at substantially different positions to independently detect and output a plurality of loads, in addition to an average value of these plurality of outputs being set as a load W, it is also appropriate that an average value is obtained after each of the detection loads is weighted according to type of passenger, that low-pass filter processing is conducted to obtain the sum of low-frequency components of the detection loads, or that low-pass filter processing is conducted to obtain a low-frequency component of an average value thereof. Also in these cases, it is preferable to improve the processing response by avoiding the low-pass filter processing for the classification between the "unoccupied" and the "adult" or the "child" and to further improve the accuracy by conducting the low-pass filter processing for the classification between the "adult" and the "child".

(Test Results)

Referring to FIGS. 9 to 15, a description will be given hereinbelow of the test results of judgments made through the use of the pressure-sensitive sensor 2 according to the above-described judging methods.

Figure 9:
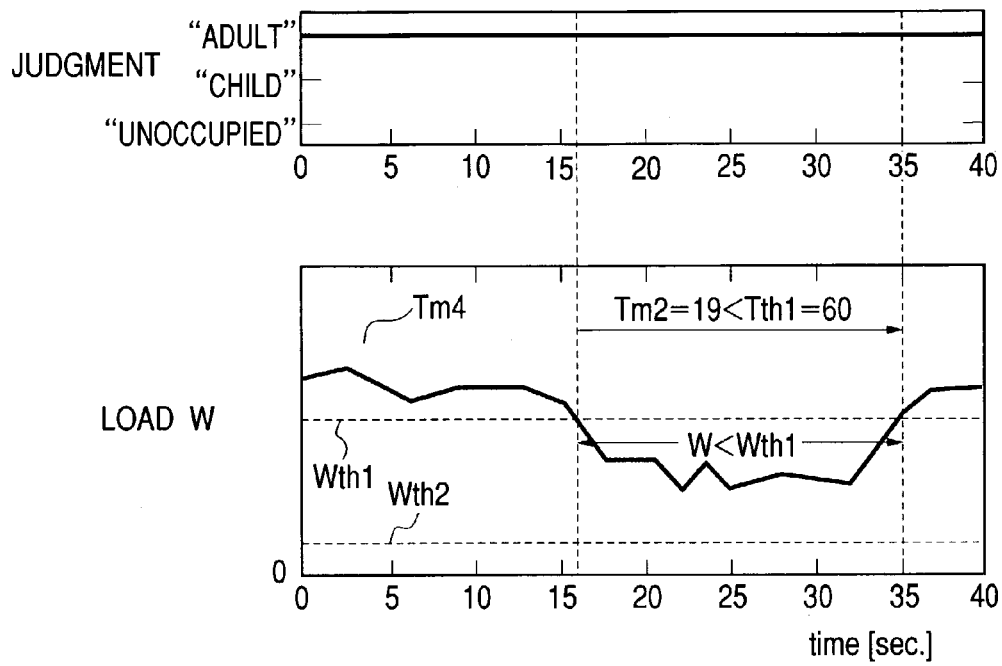
FIG. 9 is a timing chart showing an example of judgment variation in a case in which a sensor output lowers due to the running of a vehicle in a state where an adult sits on a seat of the vehicle.

FIG. 9 is a timing chart showing a judgment operation to be conducted when the output level of the pressure-sensitive sensor 2 lowers due to the influence of a vehicle running acceleration acting on an adult. In this case, although the time period in which the load W lowers to be below the load threshold Wth1 becomes 19 seconds, the timer Tm2 in the step S217 is set at 60 seconds, which eliminates the possibility of the occurrence of an erroneous judgment indicating the "child".

Figure 10:
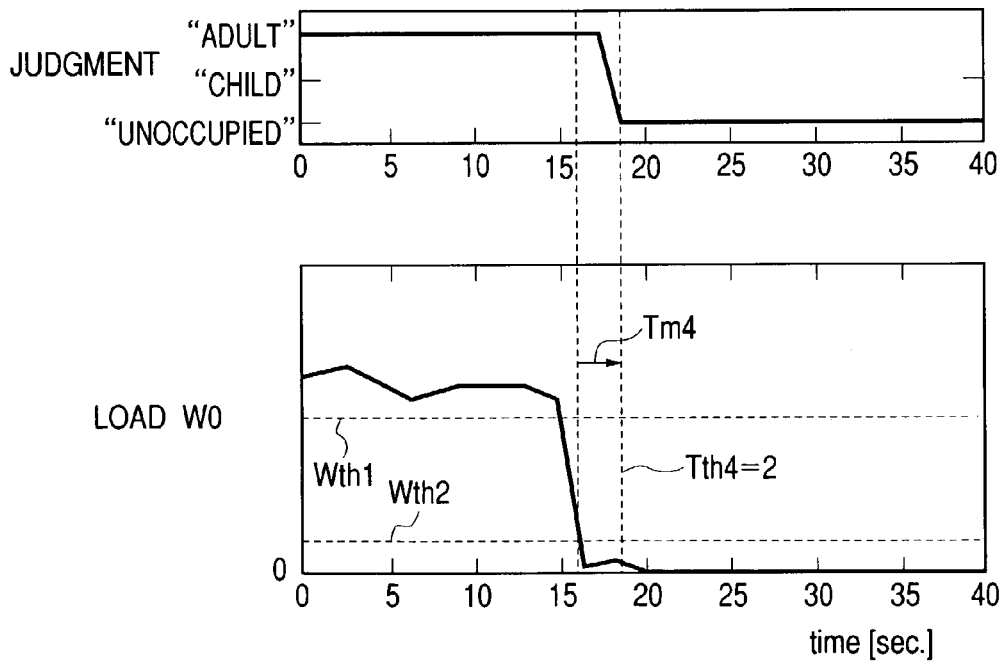
FIG. 10 is a timing chart showing an example of judgment variation in the case of the variation from an adult-seated condition to an unoccupied condition.

FIG. 10 is a timing chart showing a state transition from an adult-seated condition to an unoccupied condition. In this case, when two seconds elapse after the load W lowers to be below the load threshold Wth2, since the threshold time period Tth4 of the timer Tm4 in the step S236 is set at two seconds, the judgment that it is the "unoccupied" becomes quickly possible.

Figure 11:
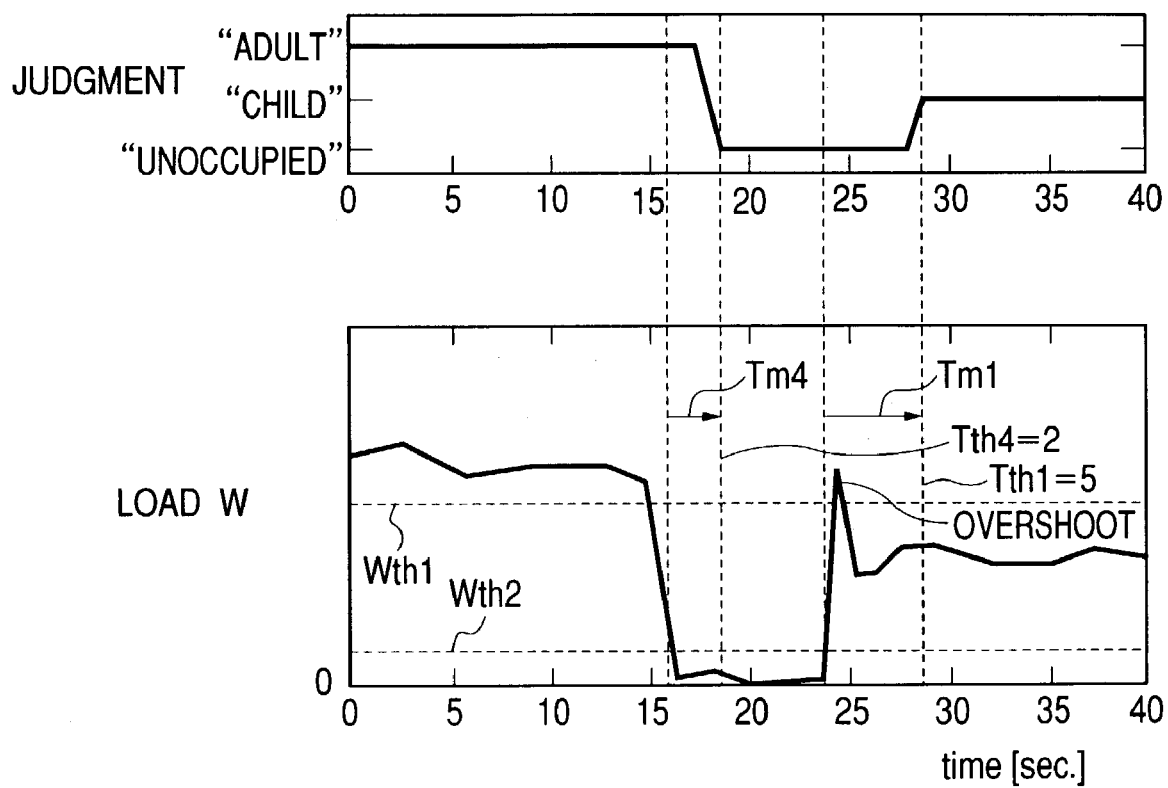
FIG. 11 is a timing chart showing an example of judgment variation in the case of the variation from an adult-seated condition to a child-seated condition.

FIG. 11 is a timing chart showing a case in which, after the variation from the adult-seated condition to the unoccupied condition, a child sits forcibly on the seat to cause overshoot. In this case, immediately after the child sits thereon, there is a possibility that made is an erroneous judgment indicating the variation from the "unoccupied" to the "adult". However, since the time of the overshoot is shorter than two seconds, no erroneous judgment indicating the transition from the "unoccupied" to the "adult" takes place.

Figure 12:
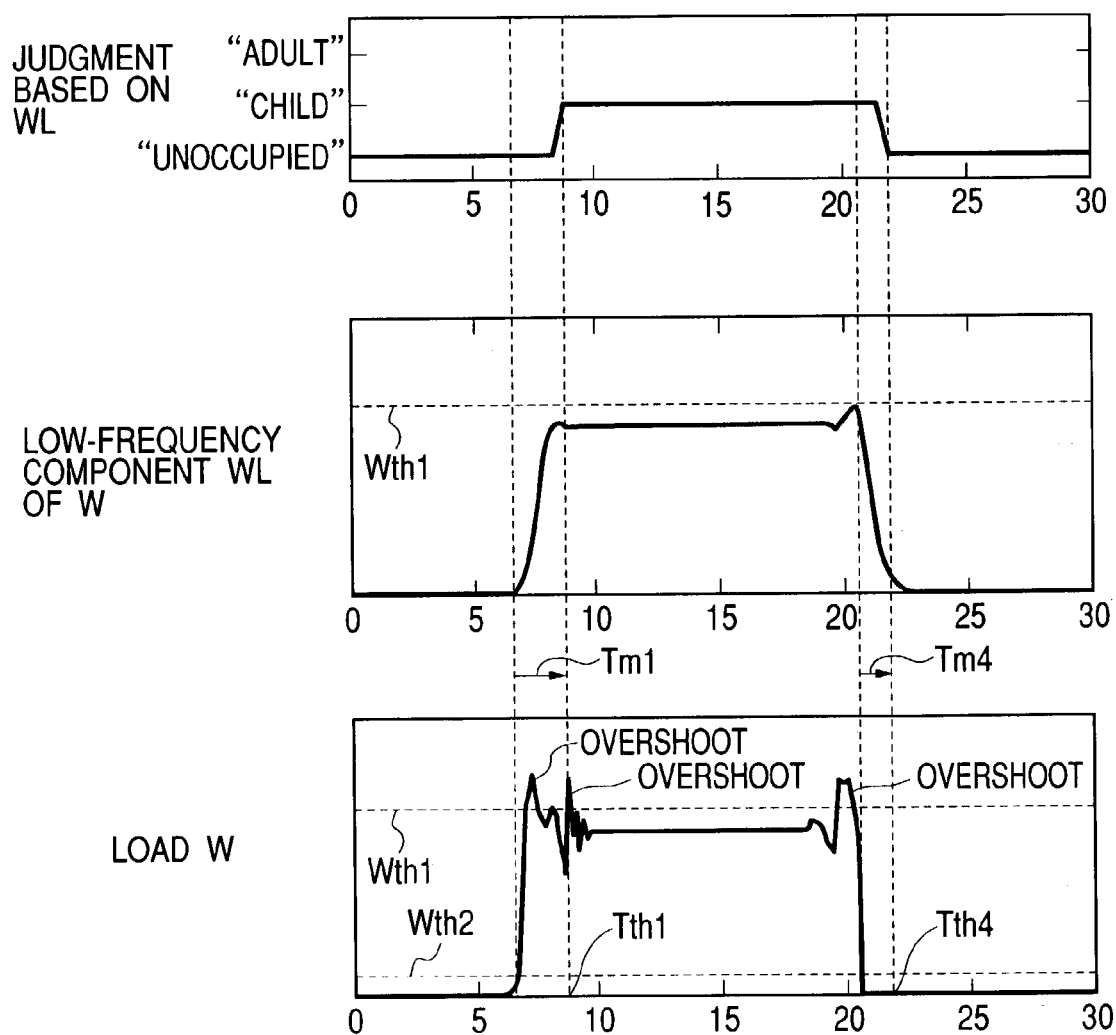
FIG. 12 is a timing chart in a case in which low-pass filter processing is conducted for a judgment on a state transition from an "unoccupied" class to a "child" class.

FIG. 12 is a timing chart showing a case of the variation from an unoccupied condition through a child-seated condition to an unoccupied condition. In this case, when the low-pass filter processing is not conducted with respect to the load W, overshoot occurs to cause an erroneous judgment or delay of judgment. On the other hand, when a low-frequency component WL of the load W is extracted through low-pass filter processing, quick judgment becomes feasible with high accuracy.

Figure 13:
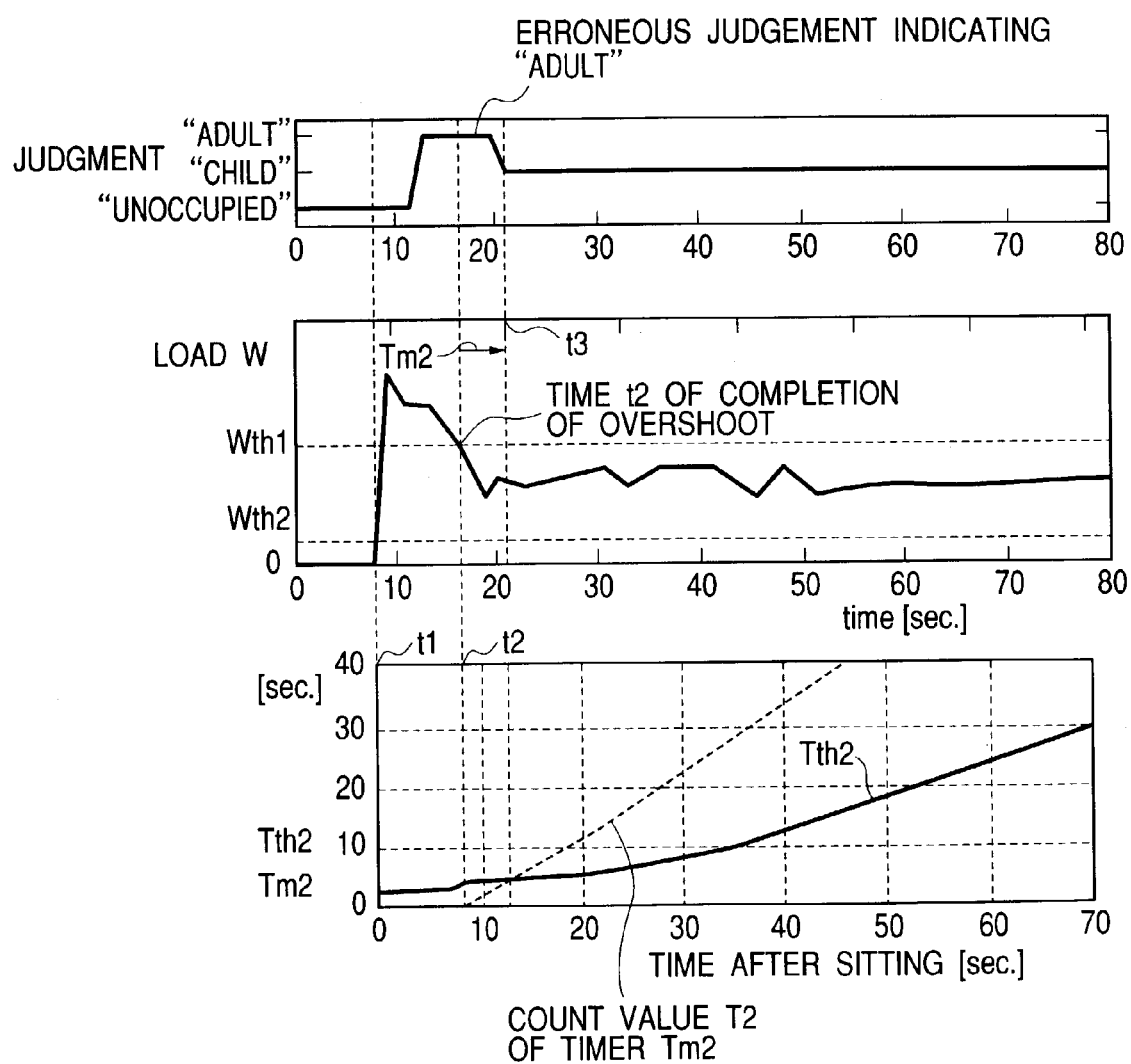
FIG. 13 is a timing chart in a case in which prolongation processing on a threshold time period is conducted for a judgment on a state transition with overshoot from an "unoccupied" class to a "child" class.

FIG. 13 is a timing chart showing a case in which, at the variation from an unoccupied condition to a child-seated condition, a child sits intensely to produce a large overshoot. In this case, originating from the large overshoot, an erroneous judgment indicating the variation from the "unoccupied" to the "adult" is made immediately after the sitting of the child because the threshold time period Tth1 is short. However, thereafter, the threshold time period Tth2 for the change from the "adult" to the "child", although being short at the beginning of the sitting (at the state transition from the "unoccupied" to the "adult"), is gradually prolonged in correlation with the running time (elapsed time) from the time t1 of the sitting and, therefore, owing to the short threshold time period Tth2 at the beginning of the sitting, the count value T2 of the timer Tm2 starting at time t2 that the variation from the "adult" to the "child" occurs after the completion of the overshoot enables quick detection of a drop of the load W after the overshoot for outputting the judgment result, i.e., the state transition from the "adult" to the "child". In addition, when a long time elapses from the time of the sitting, since the threshold time period Tth2 becomes sufficiently long, the judgment indicating the "child" is maintainable without being puzzled by a brief variation of the load W. That is, in this mode, the judgment accuracy is enhanced by quickly correcting an erroneous judgment indicating the "adult" due to the overshoot at the beginning of the sitting of the child and by suppressing a subsequent hasty judgment indicating the variation from the "child" to the "adult".

Figure 14:
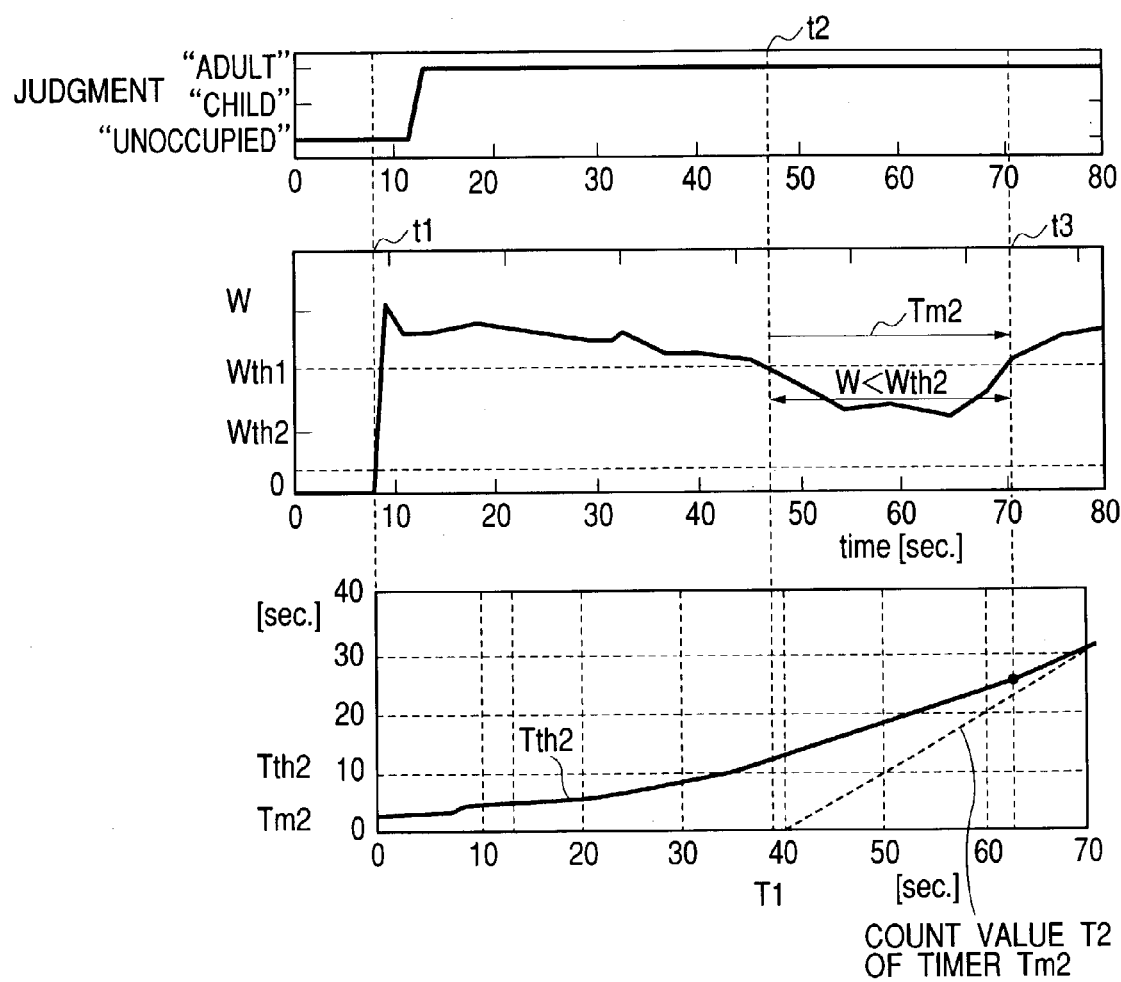
FIG. 14 is a timing chart in a case in which prolongation processing on a threshold time period is conducted when a load lowers due to a posture variation in an adult-seated condition.

FIG. 14 is a timing chart showing a case in which an adult sits on the seat and the load W drops due to a subsequent posture variation of the adult. In this case, although the load W become below the load threshold Wth1 from the time t2, since this posture variation occurs at the time that a long time elapses from the time (sitting time) t1 that the load W exceeds the load threshold Wth2 and the threshold time period Tth2 is sufficiently prolonged, even if a state in which the load W is smaller than the load threshold Wth1 continues (from the time t2 to the time t3) due to the above-mentioned posture variation, the judgment is not changed from the "adult" to the "child" in error.

(Third Embodiment)

A description will be given hereinbelow of another embodiment of the present invention.

In this embodiment, the classification between the "adult" and the "child" is made on the basis of a two-dimensional sitting pattern of a passenger on the sitting section of the seat 1 (or a three-dimensional sitting pattern additionally including, as a dimension, the magnitude of a load at each part), while the classification between the unoccupied condition and the passenger-seated condition is made on the basis of the load detected by the pressure-sensitive sensor 2 as well as the above-described first and second embodiments.

First of all, a description will be given hereinbelow of the advantages of the classification between the "adult" and the "child" to be made on the pattern matching between two-dimensional patterns. An adult and a child obviously differ from each other in sitting area on the sitting section of the seat 1, and the variation of the sitting area stemming from the posture variation of the passenger is smaller in comparison with the variation of the load W originating from the posture variation of the passenger and a two-dimensional spatial configuration of the human sitting surface has a peculiar pattern different from, for example, a child safety seat. Therefore, when a large number of load sensors are distributively located in the sitting section 3 of the seat 1, it is obviously possible that the classification between the "adult" and the "child" is made on the basis of a two-dimensional sitting pattern forming a set of signals outputted from the load sensors. Incidentally, since the removal of a child safety seat is remote from the subject matter of the present invention, the description thereof is omitted here.

In this embodiment, as the sheet-like pressure-sensitive sensor 2 in the sitting section 3, N×M (N and M are an integer equal to or more than 3) pressure-sensitive devices are located in the form of a matrix, and each of the pressure-sensitive devices is made to independently output a load (value indicative of a pressure) to the controller 2. Such a multipoint detection type pressure-sensitive sensor 2, for example, the pressure-sensitive sensor 2 shown in FIG. 2, is merely designed to derive signals independently from the pressure-sensitive devices, indicated by black circles in FIG. 2, and the description thereof using an illustration will be omitted.

The controller 2 carries out operations on pattern matching between a two-dimensional pattern of loads based on signals received from the pressure-sensitive devices and an "adult" having a pattern defined by a standard group, a "child" having a pattern indicated by a standard group, thus obtaining body dimension index (exponent) of a sitting passenger (an index representative of body dimensions of a passenger who sits on a seat; hereinafter referred to equally as a "body dimension Hs") on the basis of the result of the operations. This body dimension index Hs is a value of a function representative of which of an "adult" having a standard body dimension (sitting in a normal posture) and a "child" having a standard body dimension (sitting in a normal posture) a body dimension of a passenger having a correlation with the detected pattern approximates to, and is obtained through the pattern matching processing on the two-dimensional pattern of the loads. A concrete arithmetic sequence itself for obtaining the body dimension index Hs through the use of the pattern matching processing has been described in detail in Japanese Patent Laid-Open No. 2001-201412 which corresponds to an application filed by the present applicant, and the detailed description thereof will be omitted here. The obtained body dimension index Hs is compared with a predetermined threshold (body dimension threshold) TH to be classified with respect to the "adult" and the "child".

However, as in the case of the above-mentioned classification between the "adult" and the "child" depending upon the load W, in the division among the body dimension indexes Hs according to the body dimension threshold TH, the body dimension index Hs varies with the passenger posture variation or the vehicle acceleration, which can cause an erroneous judgment.

Accordingly, in this embodiment, for the judgment, the variation of the judgment (state transition) between the "adult" and the "child" is recognized only in a case in which that variation continues for a predetermined threshold time period Tth. This essentially the same as the technical idea in the above-described embodiment in which the variation of the judgment (state transition) between the "adult" and the "child" stemming from the variation of the load W is recognized only when that variation lasts for the predetermined threshold time period Tth.

In addition, in this embodiment, at the judgment on the state transition between the "adult" and the "child", the body dimension index Hs is classified according to the body dimension threshold TH and this state transition is determined when it lasts for a predetermined threshold time period, while the judgment on the state transition between the "unoccupied" and the "passenger-sitting" is made by classifying the load W according to the load threshold Wth2 as well as the above-described embodiment and further by finding that this state transition lasts for a predetermined time period. This enables a high-accuracy judgment on the state transition between the "adult" and the "child" and permits a quick judgment on the presence or absence of an unoccupied seat, thus achieving preferable judgments.

Figure 15:
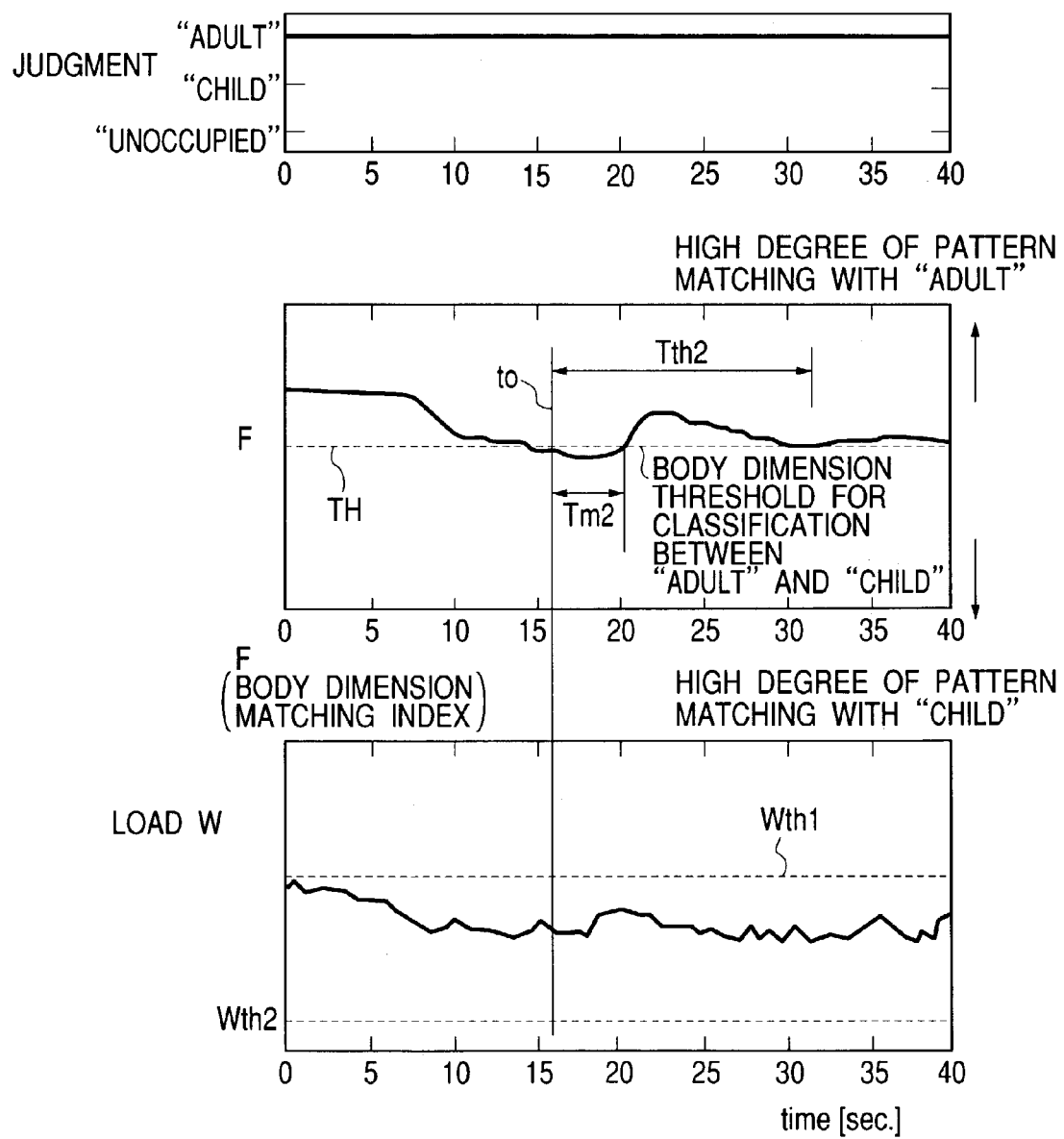
FIG. 15 is a timing chart in the case of a judgment on a state transition from an "adult" class to a "child" class according to a two-dimensional seated pattern.

FIG. 15 is a timing chart showing one example of this embodiment, concretely showing an example in which an adult sits on the seat and the vehicle turns at a high speed. In this example, although the timer Tm2 starts at the time t0 that the value of the body dimension index Hs drops toward the "child" side with respect to the body dimension threshold TH, the body dimension index Hs is restored toward the "adult" side before the threshold time period Tth2 is reached, which prevents an erroneous judgment. On the other hand, since the load W becomes below the load threshold Wth1 for a considerably long time within this time period, there is a possibility of the occurrence of an erroneous judgment. This is because the body dimension index Hs has a characteristic less susceptible to the influence of the vehicle acceleration in comparison with the load W.

In the above-described embodiments, the adjustment of the threshold time period and the low-pass filter processing can naturally be conducted through software operations based on well-known microcomputer processing, and in the third embodiment, the operation itself for obtaining the body dimension index Hs has been described in detail in the above-mentioned publication, so the body dimension index Hs can apparently be calculated on the basis of this method.

It should be understood that the present invention is not limited to the above-described embodiments, and that it is intended to cover all changes and modifications of the embodiments of the invention herein which do not constitute departures from the spirit and scope of the invention.

What is claimed is:

1. A passenger judging apparatus comprising:
   a load sensor for detecting a load acting on a seat of a vehicle; and
   judging means for classifying said load, converted into a signal, as one of a multiplicity of classes according to a predetermined load threshold to make a judgment on the presence or absence of a passenger or a type thereof,
   said judging means making a judgment indicating the occurrence of a state transition forming a transition between said classes when the detected load stays continuously in said class for a predetermined threshold time period, with said threshold time period being variably set to be different in length in determining at least a plurality of state transitions.

2. The apparatus according to claim 1, wherein said judging means has an "unoccupied", an "adult" and a "child" as said classes, and said threshold time period for said state transition between said "unoccupied" and said "adult" or said "child" is set to be shorter than said threshold time period for said state transition from said "adult" to said "child".

3. The apparatus according to claim 1, wherein said judging means has an "unoccupied", an "adult" and a "child" as said classes, and said threshold time period for said state transition between said "unoccupied" and said "adult" or said "child" is set to be shorter than said threshold time period for said state transition from said "child" to said "adult".

4. The apparatus according to claim 1, wherein said judging means has an "unoccupied", an "adult" and a "child" as said classes, and said threshold time period for said state transition from said "child" to said "adult" is set to be shorter than said threshold time period for said state transition from said "adult" to said "child".

5. The apparatus according to claim 1, wherein said judging means has an "unoccupied", an "adult" and a "child" as said classes, and said threshold time period for said state transition from said "adult" or said "child" to said "unoccupied" is set to be shorter than said threshold time period for said state transition from said "unoccupied" to said "adult" or said "child".

6. The apparatus according to claim 1, wherein said judging means makes a judgment on said state transition between said "unoccupied" constituting said class and another class on the basis of said load including a relatively large quantity of high-frequency signal component in comparison with a judgment on said state transition between said classes other than said "unoccupied".

7. The apparatus according to claim 1, wherein said judging means has an "unoccupied", an "adult" and a "child" as said classes, and at said state transition from said "unoccupied" to said "adult" or said "child", said threshold time for a judgment on said state transition between said "adult" and said "child" is prolonged in a state correlated with the elapsed time from when a judgment is made that said "unoccupied" is canceled.

8. The apparatus according to claim 1, wherein said load sensor detects a distribution of a surface pressure on a sitting face of a seat, and said judging means compares said load forming the sum of said surface pressures detected by said load sensor with a predetermined first load threshold to make a judgment as to whether or not said class is said "unoccupied", and calculates a value of a function having a correlation with a body dimension of a passenger on the basis of a two-dimensional distribution of said surface pressures to compare said function value with a predetermined second load threshold for making a judgment between said "adult" and said "child".

* * * * *